US010856054B2

(12) United States Patent
Sankaran et al.

(10) Patent No.: US 10,856,054 B2
(45) Date of Patent: Dec. 1, 2020

(54) SYSTEMS, APPARATUS AND METHODS FOR SECURE AND EFFICIENT DATA TRANSMISSION ACROSS LOCAL AREA NETWORKS

(71) Applicant: Digital Technology Services, LLC, Palm Beach, FL (US)

(72) Inventors: Sri Sankaran, Winnetka, IL (US); William Baine Morgan Dedman, West Palm Beach, FL (US)

(73) Assignee: Digital Technology Services, LLC, Palm Beach, FL (US)

( * ) Notice: Subject to any disclaimer, the term of this patent is extended or adjusted under 35 U.S.C. 154(b) by 0 days.

(21) Appl. No.: 16/576,087

(22) Filed: Sep. 19, 2019

(65) Prior Publication Data

US 2020/0099996 A1 Mar. 26, 2020

Related U.S. Application Data

(60) Provisional application No. 62/733,914, filed on Sep. 20, 2018.

(51) Int. Cl.
*H04N 21/81* (2011.01)
*H04L 29/08* (2006.01)
(Continued)

(52) U.S. Cl.
CPC .......... *H04N 21/812* (2013.01); *H04L 67/32* (2013.01); *H04N 21/4725* (2013.01);
(Continued)

(58) Field of Classification Search
None
See application file for complete search history.

(56) References Cited

U.S. PATENT DOCUMENTS 5,910,987 A * 6/1999 Ginter .................... G06F 21/10
348/E5.006
6,996,714 B1 2/2006 Halasz et al.
(Continued)

FOREIGN PATENT DOCUMENTS

AU 722615 B2 8/2000
WO WO 2013/158653 A1 10/2013

OTHER PUBLICATIONS

International Search Report and Written Opinion dated Nov. 25, 2019, for International Application No. PCT/US2019/051930, 12 pages.
(Continued)

*Primary Examiner* — Fernando Alcon
(74) *Attorney, Agent, or Firm* — Cooley LLP

(57) ABSTRACT

In some embodiments, a method includes establishing a connection between a digital content control device that is part of a first LAN and an RCM server. A first authentication code is transmitted from the digital content control device to the RCM server via the network connection such that the RCM server: a) validates the first authentication code, and b) transmits a second authentication code to the digital content control device via the network connection. Using the first authentication code and the second authentication code, a secure two-way communication channel is established between the digital content control device and the RCM server. A set of auxiliary content is received at the digital content control device and from a content provider of a second LAN via the RCM server to be presented with the available programming content on the at least one media device.

23 Claims, 3 Drawing Sheets

(51) Int. Cl.
*H04N 21/858* (2011.01)
*H04N 21/4725* (2011.01)
*H04N 21/472* (2011.01)
*H04N 21/475* (2011.01)

(52) U.S. Cl.
CPC ... *H04N 21/4755* (2013.01); *H04N 21/47205* (2013.01); *H04N 21/8583* (2013.01); *H04N 21/8586* (2013.01)

(56) References Cited

U.S. PATENT DOCUMENTS

| | | |
|---|---|---|
| 8,560,387 B2 | 10/2013 | Amidon et al. |
| 2004/0136358 A1 | 7/2004 | Hind et al. |
| 2007/0046819 A1 | 3/2007 | Sasakura et al. |
| 2008/0177998 A1* | 7/2008 | Apsangi ............. H04N 21/4623 713/155 |
| 2010/0202450 A1* | 8/2010 | Ansari .................... H04L 63/10 370/389 |
| 2013/0132515 A1 | 5/2013 | Mostafa et al. |
| 2015/0089222 A1* | 3/2015 | White ................. H04L 63/0428 713/168 |
| 2020/0177965 A1* | 6/2020 | Fawcett ............. H04N 21/6334 |

OTHER PUBLICATIONS

BrightSign, The Bright Side of Signage, Brochure, Copyright 2018 by BrightSign, LLC, 16 pages.

* cited by examiner

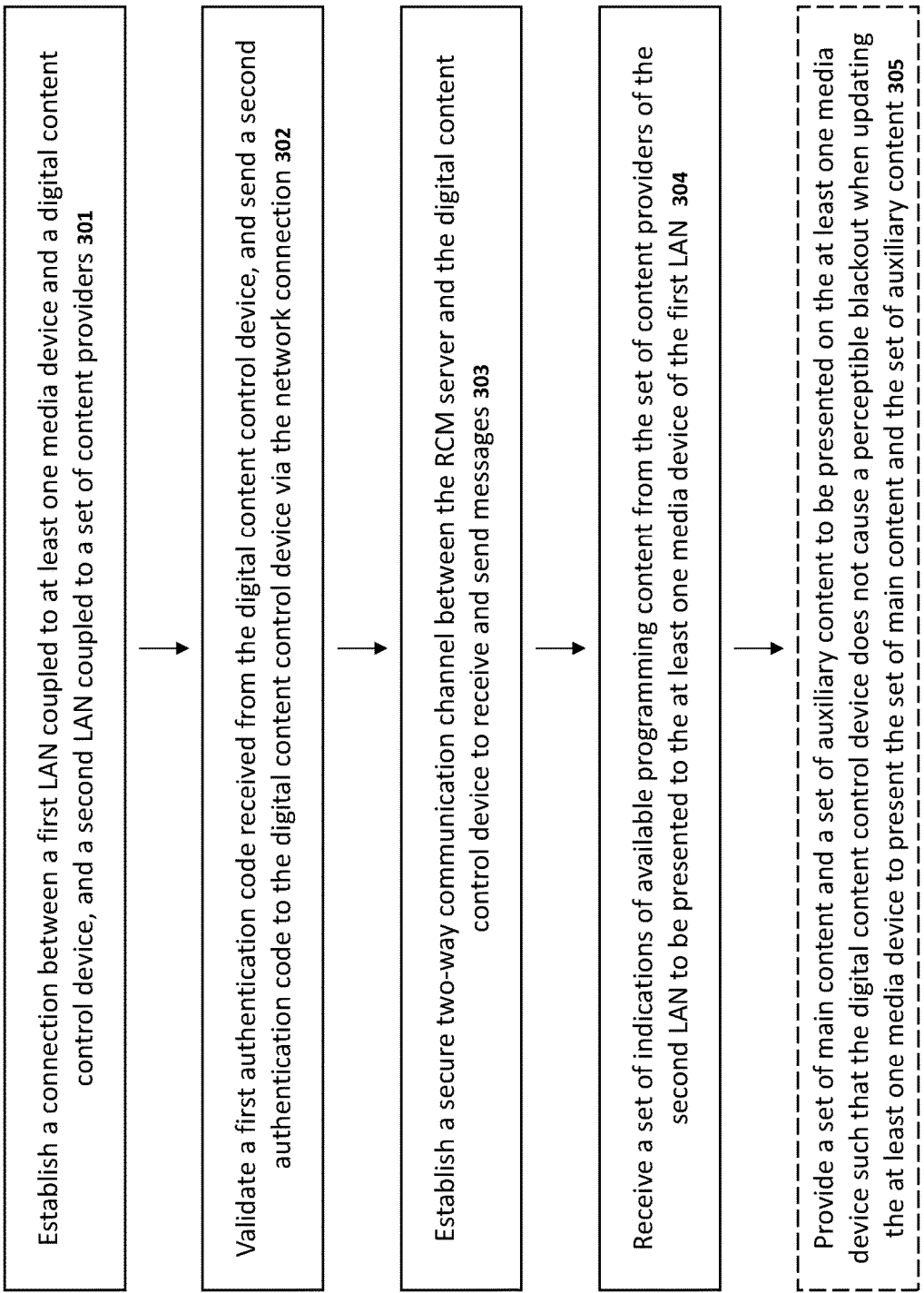

SYSTEMS, APPARATUS AND METHODS FOR SECURE AND EFFICIENT DATA TRANSMISSION ACROSS LOCAL AREA NETWORKS

CROSS-REFERENCE TO RELATED APPLICATIONS

This application claims priority to and the benefit of U.S. Provisional Patent Application No. 62/733,914, filed Sep. 20, 2018 and titled "Systems, Apparatus and Methods for Secure and Efficient Data Transmission Across Local Area Networks," which is incorporated herein by reference in its entirety.

TECHNICAL FIELD

The present application generally relates to efficient data transmission across local area networks, and in particular to methods and apparatus that enables media devices to communicate with media content providers in a secure and efficient manner.

BACKGROUND

Content producers such as television networks deliver their products to consumers with little or no ability on the part of consumers to control, alter or manage the delivery and/or consumption of the content. Some known control boxes on a local area network (LAN) can access websites residing on the LAN, but may not be able to readily access websites not on the LAN for security reasons (e.g., the LAN may not allow cross domain access). Cross domain access refers to programmatic access (e.g., via a computer program written in a language such as Javascript) to a website on another domain from one domain. Cross domain access can lead to security compromises, however, as a user accessing a website on one LAN may in fact be unknowingly sending data to and receiving data from another site on a different LAN that may be compromised in some way. To prevent such adverse consequences, cross domain access may be denied between websites operating on different LANs, or cross domain access may be allowed to selected sites on a "safe list." "Socket programming" with direct connection to a third party website can also be implemented. Each of these solutions has its own drawbacks including a user's inability to create/access the "safe list" or the requirement on websites to convert their websites to program sockets. Thus, a need exists for improved systems, devices and methods that allow devices, such as set-top boxes, to securely access sites and/or content across domains to safely transmit and/or receive data.

SUMMARY

In some embodiments, a method includes establishing a connection between a digital content control device that is part of a first LAN and an RCM server. A first authentication code is transmitted from the digital content control device to the RCM server via the network connection such that the RCM server: a) validates the first authentication code, and b) transmits a second authentication code to the digital content control device via the network connection. Using the first authentication code and the second authentication code, a secure two-way communication channel is established between the digital content control device and the RCM server. A set of auxiliary content is received at the digital content control device and from a content provider of a second LAN via the RCM server to be presented with the available programming content on the at least one media device.

BRIEF DESCRIPTION OF THE DRAWINGS

FIG. 3 is flowchart illustrating a method of establishing a secure two-way communication channel between a server and a digital content control device.

DETAILED DESCRIPTION

Figure 1:
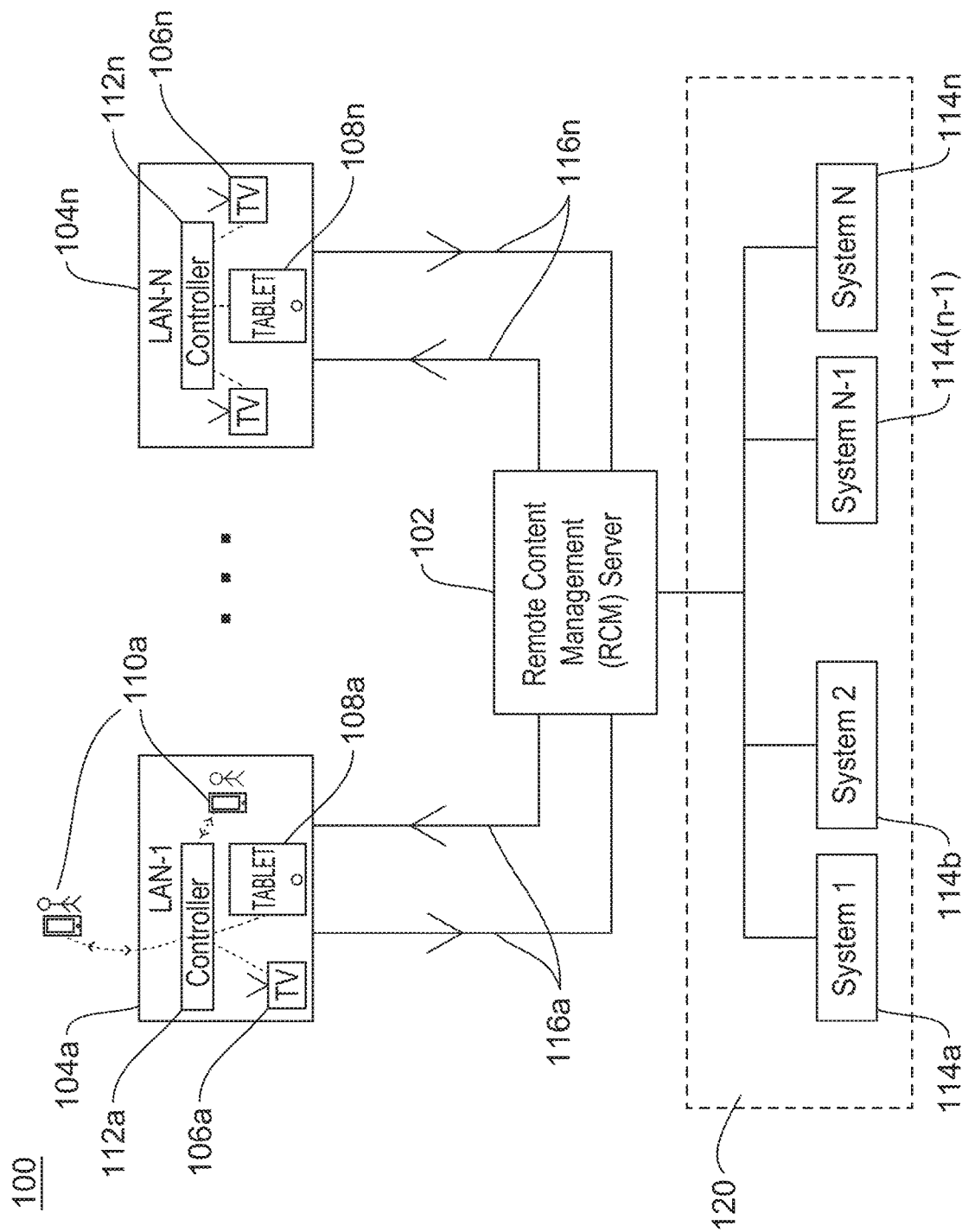
FIG. 1 is a schematic block diagram of a system for remotely managing content delivered to a local network area (LAN) including a set of devices coupled to the LAN, according to an embodiment.

In some embodiments, the methods and systems disclosed herein allow the remote and seamless management of live content inside display devices. In some implementations, this may be accomplished by allowing a local area network to establish communication with smartphones without the need for any special hardware and/or software and still comply with cross domain browser communication protocols and/or restrictions.

In some embodiments, a method includes establishing a connection between a digital content control device and a remote content management (RCM) server via a network connection. The digital content control device is part of a first local area network (LAN). The first LAN is operatively coupled to at least one media device. The method further includes transmitting a first authentication code from the digital content control device to the RCM server via the network connection such that the RCM server, during operation and after receiving the first authentication code: a) validates the first authentication code, and b) transmits a second authentication code to the digital content control device via the network connection. The method further includes establishing, using the first authentication code and the second authentication code, a secure two-way communication channel between the digital content control device and the RCM server to receive and send messages. The method further includes receiving, via the RCM server, an indication of available programming content from a content provider to be presented on the at least one media device of the first LAN. The content provider being part of a second LAN that is connected to the RCM server. The method further includes receiving a set of auxiliary content at the digital content control device from the RCM server via the network connection and to be presented with the available programming content on the at least one media device, based on at least one of the indication of available programming content, a location of the first LAN, a location of the second LAN, a set of user feedback, or a time of display of content.

In some embodiments, an apparatus includes a memory of a remote content management (RCM) server and a processor of the RCM server. The processor is operatively coupled to the memory. The processor can be configured to establish a connection between a first local area network (LAN) and a second LAN. The first LAN is operatively coupled to at least one media device and a digital content control device, and the second LAN is operatively coupled to a set of content providers. The processor can be configured to validate a first authentication code received from the digital content control device, and send a second authentication code to the digital content control device via the network connection. The processor can be configured to establish a secure two-way communication channel between the RCM server and the digital content control device to receive and send messages that include at least one of the first authentication code or the second authentication code. The processor can be configured to receive a set of indications of available programming content from the set of content providers of the second LAN and to be presented to the at least one media device of the first LAN. The processor can be configured to provide a set of main content associated with the set of indications of available programming content and a set of auxiliary content associated with the set of indications of available programming content, to the digital content control device and to be presented on the at least one media device such that the digital content control device does not cause a perceptible blackout when updating the at least one media device to present the set of main content and the set of auxiliary content.

In some embodiments, a non-transitory processor-readable medium of a remote content management (RCM) server, stores code representing instructions to be executed by a processor. The code includes code to cause the processor to establish a connection between the RCM server and a digital content control device via a network connection. The digital content control device is part of a first local area network (LAN) and the first LAN is operatively coupled to at least one media device. The code includes code to cause the processor to transmit a first authentication code from the RCM server to the digital content control device such that the digital content control device validates the first authentication code and transmits a second authentication code to the digital content control device via the network connection. The code includes code to cause the processor to establish, using the first authentication code and the second authentication code, a secure two-way communication channel between the RCM server and the digital content control device to receive and send at least one of a Hypertext Markup Language (HTML) file, an Extensible Markup Language (XML) file or a JavaScript Object Notation (JSON) file. The code includes code to cause the processor to receive a set of indications of available programming content from a set of content providers to be presented to the at least one media device of the first LAN. The set of content providers is part of a second LAN that is connected to the RCM server. The code includes code to cause the processor to provide a set of main content associated with the set of indications of available programming content and a set of auxiliary content associated with the set of indications of available programming content, to the digital content control device and to be presented on the at least one media device such that the digital content control device does not cause a perceptible blackout when updating the at least one media device to present the set of main content and the set of auxiliary content.

FIG. 1 is a schematic block diagram of a system for remotely managing content delivered to a local area network (LAN) including a set of devices (also referred to herein as "media devices", or "multi-media devices") coupled to the LAN, according to an embodiment. Each device from the set of devices can include but is not limited to, for example, a computer, a laptop, a smartphone, a tablet, a television (TV), a video wall, a projector, a jumbotron, and/or the like. In some embodiments, a remote content management (RCM) sever 102 can be connected to one or more local area networks (LANs) 104a-104n that interconnect a set of multi-media devices such as television sets 106a-106n, computers/tablets 108a-108n, personal devices such as smartphones 110a-110n, display monitors, and/or the like. In some implementations, the connections (also referred to herein as the "two-way communication channels") 116a-116n between the LANs and the RCM server 102 can be two-way communication channels, facilitated by an operating system configured to allow communication with external servers, for example, via internet and/or networking protocols such as, for example, Hypertext Transfer Protocol (HTTP) or Hypertext Transfer Protocol Secure (HTTPS). For example, the RCM sever 102 (e.g., a processor of the RCM server 102) can establish connection 116a-116n with the LANs 104a-104n (or more specifically, the digital content control devices 112a-112n within the LANs 104a-104n) by sending a signal (via the internet or other network) to establish the connections 116a-116n. For another example, the digital content control device 112a-112n (e.g., a processor of the digital content control device 112a-112n) can establish the connections 116a-116n with the RCM server 102 by sending a signal to the RCM server 102 to establish the connections. Optionally the RCM server 102 can be connected to a set of systems (e.g., devices or collection of devices), for example, within a LAN 120 (while shown as a single LAN 120, in some implementations this could include systems within multiple LANs). The connections 116a-116n can be secured to establish secured two-way communication channel, as described in further details herein.

As noted above, the media devices can be television sets 106a-106n, computers/tablets 108a-108n, personal devices such as smartphones 110a-110n, and/or the like. In some embodiments, the media devices can include other personal computing devices such as a desktop computer, a laptop computer, a standard mobile telephone, a personal digital assistant (PDA), a smartwatch, etc. In some implementations, the media devices may include a visual display. For example, the visual display can be a cathode ray tube (CRT) display, a liquid crystal display (LCD) display, a light emitting diode (LED) display, and/or the like. In some instances, the display may be interactive and allow a user to provide input into the devices. For example, the display may be a touch screen.

In some implementations, the LAN 104a-104n can include digital content control devices 112a-112n (also referred to herein as controllers) that can be used to control and/or manage the content that is displayed on the media devices. The digital content control devices 112a-112n can communicate with the RCM server 102 via the connections 116a-116n. An example of the digital content control devices 112a-112n includes a television set-top box or similar media device. In some implementations, the digital content control devices 112a-112n can be and/or include input interfaces, a processor, a memory, output interfaces, a server, a compute device, one or more antennas and/or other structure that allow the digital content control devices 112a-112n to control/manage the media devices and communicate with the RCM server 102.

The processor of a digital content control device 112a-112n can be any suitable processing device configured to run and/or execute a set of instructions or code such as, for example, a general purpose processor, a central processing unit (CPU), an accelerated processing unit (APU), an application specific integrated circuit (ASIC), a field programmable gate array (FPGA), a Digital Signal Processor (DSP), and/or the like. In some implementations, the memory can store instructions to cause the processor to execute the instructions and/or other modules, processes, and/or functions associated with managing data communication signals such as, for example, to ensure one or more data communication signal(s) are received at the input interfaces and properly sent via output interfaces, to enforce any size and/or data type restrictions and/or the like.

The input interfaces of the digital content control devices 112a-112n can be any suitable components, subsystems, and/or devices that can receive data signals (e.g., interactive communication signals, video signals, etc.), such as, but not limited to, data transmitted from the RCM server 102 via the connections 116a-116n. More specifically, the input interfaces can include one or more wired and/or wireless interfaces, such as, for example, Ethernet interfaces, optical carrier (OC) interfaces, asynchronous transfer mode (ATM) interfaces, analog interfaces, coaxial interfaces, High-Definition Multimedia Interface (HDMI) interfaces and/or the like. In some instances, the input interfaces are connected to an internet service provider (ISP) and a video source (e.g., DVB provider, satellite TV provider, cable TV provider, TV broadcast antenna, etc.), respectively. In some implementations, the input interfaces can be, for example, a network interface card and/or the like that can include at least a wireless radio (e.g., a Wi-Fi® radio, a Bluetooth® radio, etc.). The input interfaces can receive the data communication signals (e.g., data from RCM server 102 located on the World Wide Web via an Internet connection, DVB signal and/or the like) through a wired medium (e.g., a coaxial cable, Ethernet cable, HDMI cable, etc.). In some instances, the input interfaces can receive the data communication signals through a wireless medium (e.g., satellite, Wi-Fi®, Bluetooth®, etc.). The input interfaces can forward the received data communication signals to the processor of the digital content control devices 112a-112n for processing.

The output interfaces of the digital content control devices 112a-112n can be any suitable components, subsystems, and/or devices that can communicate with the secure two-way communication channel to transmit data to the RCM server 102. More specifically, the output interfaces can be operatively coupled to antennas and/or transceivers used to transmit the data communication signals to the RCM server 102 via the connections 116a-116n. In some implementations, the output interfaces can be, for example, a network interface card (NIC) and/or the like that can include at least a wireless radio (e.g., a Wi-Fi® radio, a Bluetooth® radio, etc.). As such, the output interfaces can transmit and/or receive signals from the RCM server 102.

The memory of the digital content control devices 112a-112n can be, for example, a random access memory (RAM), a memory buffer, a hard drive, a read-only memory (ROM), an erasable programmable read-only memory (EPROM), and/or the like. In some instances, the memory can store, for example, one or more software modules and/or code that can include instructions to cause the processor of the digital content control devices 112a-112n to perform one or more processes, functions, and/or the like. For example, in some instances, the memory can include a software module and/or code that can include instructions to cause the processor to process data communication signal(s) (e.g., received from the RCM server 102 via the connections 116a-116n). The memory can further include instructions to cause the input interfaces and output interfaces to send and/or receive one or more data communication signals associated with the input to or output from, respectively, the processor. In some instances, the memory can also store a set of rules and/or predefined policies that can be implemented. Such set of rules and/or predefined policies can be implemented by the processor.

In some embodiments, the RCM server 102 can be configured to establish a secure two-way communication channel with one or more LANs 104 (e.g., via connections 116a-116n). For example, the processor of each digital content control device 112a-112n can execute software that is configured to cause the processor of that digital content control device 112a-112n to send an identifier code (also referred to herein as the 'authentication code') to the RCM server 102 to identify that digital content control device 112a-112n. In response, the RCM server 102 can check the validity of the identifier code, and if validity is confirmed, respond to that digital content control device 112a-112n with an associated response code. In some implementations, the response code (also referred to herein as the 'authentication code') may be transmitted to the digital content control devices 112a-112n via standard communications method (e.g., through a network, such as the internet (not shown), operatively coupling the RCM server 102 with the digital content control devices 112a-112n). In some instances, the response code may not be transmitted with the use of sockets. In some instances, the transmission of the response code may not be accomplished by bypassing restrictions on cross-domain access between the LANs 104a-104n (e.g., by bypassing browser security protocols that enforce the restrictions). Upon receiving the response code, in some implementations, that digital content control device 112a-112n (and particularly the software operating thereon) can validate the response code as one coming from the RCM server 102. The digital content control device 112a-112n can validate the response code, for example, by comparing the response code against a set of predetermined authentication codes. The response code can be considered valid if the difference or distance between the response code and a predetermined authentication code from the set of predetermined authentication codes is zero (i.e., the response code equals a predetermined authentication code) or less than a predetermined value. In some instances, the digital content control device 112a-112n can validate the response code by transforming the response code to a transformed code using a transformation function, and comparing the transformed code with the identifier code. Messages received from a LAN without the correct authentication code can be rejected and a response to such messages not sent to the LAN. Thus, the security of the LANs is preserved.

In some implementations, the RCM server 102 and the digital content control device 112a are connected via a network connection, and the RCM server 102 can be configured to transmit a first authentication code to the digital content control device 112a via a network connection. The network connection can be, for example, a radio frequency (RF) communication channel, extremely low frequency (ELF) communication channel, ultra-low frequency (ULF) communication channel, low frequency (LF) communication channel, medium frequency (MF) communication channel, ultra-high frequency (UHF) communication channel, extremely high frequency (EHF) communication channel, a fiber optic commination channel, an electronic communication channel, a satellite communication channel, and/or the like. The first authentication code can be, for example, a Hypertext markup Language (HTML) script, an Extensible Markup Language (XML) script, a Javascript Object Notation (JSON) script, and/or the like. The digital content control device 112a can be configured to then transmit a second authentication code to the RCM server 102 via the communication channel. The second authentication code can be the first authentication code, an authentication code similar to the first authentication code, an authentication code derived from the first authentication code, and/or an authentication code different from the first authentication code. For example, the second authentication code can be a generated based on the first authentication code and a transformation function. After the exchanging of the first authentication code and the second authentication code between the RCM server 102 and the digital content control device 112a, a secure two-way communication channel can be established. The secure two-way communication channel can be established by including or associating at least one the first authentication code or the second authentication code to a communication message over the two-way communication channel. In some examples, the first authentication code or the second authentication code can be transmitted in an encrypted format via the connections 116a-116n.

In some implementations, the digital content control device 112a can be configured to transmit a first authentication code to the RCM server 102 via a communication channel (as opposed to the RCM server 102 transmitting the first authentication code). The first authentication code can be, for example, an HTML script, an XML script, a JSON script, and/or the like. The RCM server 102 can be configured to then transmit a second authentication code to the digital content control device 112a via the communication channel. The second authentication code can be the first authentication code, an authentication code similar to the first authentication code, an authentication code derived from the first authentication code, and/or an authentication code different from the first authentication code. For example, the first authentication code and the second authentication code could be from a set of predetermined authentication codes. After exchanging the first authentication code and the second authentication code between the digital content control device 112a and the RCM server 102, the secure two-way communication channel can be established. In some examples, the first authentication code or the second authentication code can be transmitted in an encrypted format via the communication channel.

In some embodiments, the RCM server 102 facilitates "many to many" communication services between digital content control devices 112a-112n and the external systems 114a-114n such as but not limited to remote database services. As such, the RCM server 102 is configured to provide secure communications while overcoming limitations on cross-browser services (e.g., cross-domain access restrictions). The RCM server 102, for example, can be configured to access remote databases, external payment processing systems, smartphone communication networks, and/or the like, without requiring these services to alter their existing communication protocols. The RCM server 102 transforms messages from these remote resources into an encrypted format readable by the digital content control devices 112a-112n of the LANs 104a-104n. In addition, the RCM server 102 transforms messages from the digital content control devices 112a-112n of the LANs 104a-104n and transmits these messages via an application programming interface (API) of the remote resources or systems 114a-114n. The RCM server 102 executes these transformations in at least substantially real-time—providing seamless access to the remote resources or systems 114a-114n while using little or no additional processing capacity from the LANs 104a-104n. In effect, in some implementations, the RCM server 102 acts as an extension of the digital content control devices 112a-112n of the LANs 104a-104n—enhancing the processing capabilities of the LANs 104a-104n via software rather than, or in addition to, through the use of hardware. In some implementations, the transformation of messages between formats can be accomplished using extensible markup language (XML), Javascript object notation (JSON) and/or the like.

Once the validation process is complete (e.g., using the authentication codes), the processor of each digital content control device 112a-112n (e.g., executing a program) scans for messages from RCM server 102. Each message can be configured to include an HTML file, an XML file, a JSON file, and/or the like, and can be configured further to include an authentication code (i.e., the first authentication code and/or the second authentication code). In one example, each message can be configured with the authentication code (e.g., the identifier code, the response code, and/or another suitable code). The processor (e.g., executing the program) of each digital content control device 112a-112n sends messages with valid authentication codes to the LAN (e.g., to the devices 110a-110n, 108a-108n, 106a-106n on the LAN). In some implementations, the processor of each digital content control device 112a-112n refrains from sending messages within the LAN without the valid authentication codes to the LAN. In some implementations, the RCM server 102 can be configured to randomly update the authentication code to produce an updated authentication code, and communicate the updated authentication code to the digital content control devices 112a-112n to prevent unauthorized entities from sending messages to the LAN 104a-104n. The RCM server 102 can send messages to and receive messages from the LAN 104a-104n in asynchronous and/or synchronous formats. In some implementations, the choice of messaging format allows the RCM server 102 to communicate with multiple processors on the LANs 104a-104n at least substantially simultaneously with little or no latency. For example, the processor of a digital content control device 112a of the LAN 104a may be updating the score of a baseball game, while the processor of a digital content control device (e.g., digital content control device 112n) of another LAN (e.g., LAN 104n) may be updating responses from customers on a digital monitor. In such implementations, the RCM server 102 may establish a link between a substantially real-time baseball feed (e.g., within a system 114a-114n on a second LAN) and processor of the digital content control device 112a of the first LAN 104a. Further, the RCM server 102 may at least substantially simultaneously establish a link between a social media database (e.g., within a system 114a-114n on a second LAN) and the processor of the digital content control device 112n of the second LAN 104n. In some examples, the RCM server 102 can be part of a third LAN (or third domain) and establish a secure two-way communication channel to the digital content control device 112a.

In some implementations, the capability of the RCM server 102 to facilitate cross-browser and/or cross-domain communication can also allow the LANs 104a-104n to benefit from the RCM server's ability to open multiple communication links substantially simultaneously. The browser can be, for example, the Internet Explorer™ web browser, the Chrome™ web browser, and/or the like. The RCM server 102 can also be configured to open and/or define a dedicated link to each LAN 104a-104n (or digital content control devices 112a-112n of the LANS 104-104n) and connect this link to third party services (even if, as in some implementations, the third party service doesn't offer direct links to clients). This direct connection can be referred to as 'push technology.' For example, HTML5 supports socket communications that allow servers, such as the RCM server, to directly push information to a client. Many third party resources may not support push/socket technology. The RCM server 102, however, can act as an intermediary. In some implementations, the RCM server 102 can select to push messages to the digital content control device 112a-112n or pull messages from the third party services. For example, the RCM server 102 can receive a request to receive a set of auxiliary content from a third party content provider, and select to pull to receive the set of auxiliary content. The RCM server 102 can then receive a request from a digital content control device 112 of the LAN 104a, and select to push the set of auxiliary content to the digital content control device 112. The RCM server 102 can establish a push/socket connection with the LAN (e.g., a controller of the LAN) as disclosed herein. The RCM server 102 can transform the messages from the third party service into a format acceptable by the LANs 104a-104n (or a digital content control device 112a-112n of the LAN), and then push the messages to the digital content control devices 112a-112n of the LANs 104a-104n via socket programming tools. In such implementations, the socket programming tools may not be configured to push such messages to the digital content control device 112a-112n of the LAN 104a-104n without violating cross domain or browser restrictions. In some embodiments, the browser facilitates the transmission of such push messages to the digital content control devices 112a-112n of the LANs 104a-104n while preserving the security of the LANs 104a-104n (e.g., using protocols used by the browser that enable socket communications if the cross-browser restrictions are satisfied).

In some embodiments, the methods and systems disclosed herein facilitate push communication without the need for each digital content control device 112a-112n of the LAN 104a-104n to: 1) contact each third party provider (e.g., including remote or external systems 114a-114n) to ask for that third party provider to create a push link to the LAN; and 2) provide the third party or the server 102 with the Internet Protocol (IP) address of the LAN. This can be beneficial as the third party provider would have to undertake the costs of modifying their software to provide such links. Further, the methods and systems disclosed herein reduce or eliminate the need for the third party provider to handle multiple push links to multiple LANs (and to enhance its hardware, if needed, to accomplish such tasks), thereby reducing or obviating the need for any hardware/software changes on the third party vendor side. For example, the RCM server 102 can take a single feed from a third party provider (e.g., including remote or external systems 114a-114n) and define multiple push links to the digital content control devices 112a-112n of the LANs 104a-104n, with little or no need for any special and/or custom IP addressing.

In some implementations, as noted above, the digital content control devices 112a-112n are configured to control the presentation or display of digital content on the media devices 110a-110n, 108a-108n, 106a-106n that are coupled to the LANs 104a-104n. In some implementations, the digital content is provided by providers (e.g., including remote or external systems 114a-114n) such as television networks, etc. In some implementations, auxiliary digital content can be provided by the RCM server 102, and the digital content control devices 112a-112n can control the delivery and display/presentation of the auxiliary content to the media devices 110a-110n, 108a-108n, 106a-106n. For example, the RCM sever 102 can be configured to interact with one or more external systems 114a-114n to obtain data or information for use in producing auxiliary content that can be used to replace or augment the digital content produced by content providers such as television networks. The one or more systems can include, for example, sports feed sources (e.g., live sports, etc.), payment systems (e.g., credit card systems, etc.), game/contest management systems, databases, exchanges (e.g., advertising exchanges, etc.), etc.

In some implementations, the RCM server 102 can access and interact with these systems/sources and send the information in a format that the digital content control devices 112a-112n can display on media devices 110a-110n, 108a-108n, 106a-106n connected to the LANs 104a-104n. As such, the RCM server 102 is configured to serve as a "middle person" and reduces or eliminates the need for the LANs 104a-104n to directly interact with the external or remote resources or systems 114a-114n. Further, the interaction between the digital content control devices 112a-112n of the LANs 104a-104n and the RCM server 102 may be on an almost as-needed basis, and some information may not be shared between the two entities. For example, the digital content control devices 112a-112n of the LANs 104a-104n may have the ability to display information on television screens 106a-106n, digital media screens 108a-108n or 110a-110n, etc. The digital content control devices 112a-112n of the LANs 104a-104n offer commands, for example, to show and hide display images, information, etc. on digital monitors of the media devices 106a-106n, 108a-108n or 110a-110n. The RCM server 102 sends messages to the digital content control devices 112a-112n of the LANs 104a-104n to directly execute these commands. The RCM server 102 may use or store little or no information on how the digital content control devices 112a-112n of the LANs 104a-104n process or execute these commands. For example, the RCM server 102 can send a message to the digital content control devices 112a-112n of the LANs 104a-104n to display an advertisement as image on the bottom portion of the TV screen. The message from the RCM server 102 can include the location (e.g., URL) of the image and the text content of the advertisement. In such instances, the digital content control devices 112a-112n of the LANs 104a-104n can receive the information, retrieve the advertisement and the image can appear as directed. As another example, the message from the RCM server 102 can include text indicating the winner of a contest. The RCM server 102 sends a message with this text content to the digital content control devices 112a-112n of the LANs 104a-104n, and each digital content control device 112a-112n of the LANs 104a-104n can execute a command resulting in the text message appearing as directed on one or more of the devices within that LAN. In some embodiments, the process works in reverse as well. The digital content control device 112a-112n of the LAN 104a-104n can send a message to the RCM server 102, requesting information about the winner of a particular football game. In such implementations, the digital content control device 112a-112n of the LAN 104a-104n may not have and/or store any knowledge of and/or information about the content or API of game-feed providers, but depend on the RCM server 102 for the information. The RCM server 102 executes a command to satisfy the request of the LAN 104a-104n. In a further context, the digital content control device 112a-112n of the LAN 104a-104n can send a message to the RCM server 102 to process a bill (e.g., credit card payment), and the RCM server 102 can handle the API messaging with credit card processing systems (e.g., at including remote or external systems 114a-114n) and send an 'approved/disapproved' code to the digital content control device 112a-112n of the LAN 104a-104n.

In some implementations, a digital content control device 112a can be part of a first LAN 104a that is configured to be connected to at least one user device (e.g., a television 106a, a tablet 108a, a smartphone 110a, etc.), and the RCM server 102 can be communicatively coupled to a second LAN 120 that includes at least one system 114a (also referred to herein as the 'content provider' 114a) to receive or to provide access to, at least one indication of available programming content by the at least one system 114a. The at least one indication of available programming content can indicate a live sports feed (e.g., live feed of a baseball game, live feed of a soccer game), a live gaming feed (e.g., live feed of computer game competition, statistics of a live presidential election debate, a live feed of betting on a sport event), a database or programming content, a payment system (e.g., an electronic payment system), a rewards program (e.g., coupon, special promotion, loyalty program), an online advertising exchange platform (e.g., advertisement bidding system) and/or any other suitable content. In this configuration, the RCM server 102 is configured to establish a secure two-way communication channel between the digital content control device 112a of first LAN 104a and the RCM server 102 and eliminate the need for the first LAN 104a to directly interact with the external resources, remote resources, or systems 114a of the second LAN 120.

In some instances, users of the media devices 106a, 108a, and 110a may not need to have interfaces established for the media devices 106a, 108a, and 110a to access and interact with the external systems 114a-114n (e.g., access or parse real time feeds, communicate with databases, etc.), as the interactions can occur via the RCM server 102 and the connections 116a. As such, security features of the media devices 106a, 109a, and 110a do not need to be modified or disabled when establishing the secure two-way communication channel between the digital content control device 112a of the first LAN 104a and the RCM server 102. As such, a secure cross domain access may be realized by the secure two-way communication channel between a first network domain (the first LAN 104a) and a second network domain (the second LAN 120) via RCM server 102.

In some implementations, one of the external systems 114a-114n can be an online advertising exchange platform or an advertising server. In some instances, the advertising server can be a dynamic server, and the RCM server 102 may obtain at least one auxiliary content from available programming content that is relevant or related to at least one main content from the available programming content being shown on the media devices 110a-110n, 108a-108n, 106a-106n of the LANs 104a-104n, and transmit in substantially and/or near real-time the at least one auxiliary content to the digital content control devices 112a-112n for display on the media devices 110a-110n, 108a-108n, 106a-106n. In some instances, the main content can be provided by the RCM server 102 (e.g., from an external system 114a-114n). In some instances, the main content can be provided to the digital content control device 112a-112n via another method, such as from an external LAN or an external content provider device such as, for example, a satellite television content provider, a cable television content provider, a streaming television content provider and/or any other suitable content provider that provides content directly to the LAN (or digital content control device in the LAN) and not via an RCM server 102.

In some embodiments, as an example, the external system 114a can include a first set of available programming content including at least one static content, and another system 114n can generate a second set of available programming content including at least one dynamic content. For example, the at least one static content or the at least one dynamic content can be based on events occurring in a sporting event, based on events occurring in a live sport feed, based on the location of the first LAN 104a, based on the location of the second LAN 120, based on a set of user feedback, based on time of display of content, and/or the like. The RCM server 102 can 'push' the at least one static content and/or the at least one dynamic content to the digital content control device 112a-112n (e.g., TV control box) based on information provided to the RCM server 102 from the digital content control device 112a-112n (e.g., TV control box). The digital content control device 112a-112n then sends a signal to the TV 106a-106n (or other media device 110a-110n, 108a-108n) to display the content on the TV monitors. In addition, in some embodiments, RCM server 102 may allow connection with dynamic advertising servers (e.g., a system from the external systems 114a-114n). Establishments (e.g., restaurants) can offer ads to be shown on their TV. The pricing can be based, for example, on the score of the game, the highest bid at the time of the event, and/or the like, which will vary greatly based on the unique circumstances of unique and live events (e.g., 4th and goal, tie game with only 2 seconds remaining and a time out before the last play).

In some implementations, LAN requests can be passive and/or active. For example, active requests can be sent by the digital content control devices 112a-112n of the LANs 104a-104n to the RCM server 102 (e.g., to provide score for a game, provide information on Chevy dealer ad, etc.), and the RCM server 102 can respond to these requests. In some implementations, the requests can alternatively be passive, where the digital content control device 112a-112n of the LAN 104a-104n can indicate to the RCM server 102 that game X is being televised (e.g., Redskins/Cowboys). In such implementations, the RCM server may store, based on the authentication code, information about the location of the LAN 104a-104n (e.g., zip code, restaurant theme, etc.), and may transmit commands consistent with the LAN's request based on this information. For example, the command, which is in response to the digital content control device 112a-112n of the LAN's request and may be based on the information about the LAN 104a-104n, can include: 1) display ad, 2) display winner, 3) display game information; 4) display message from patrons (e.g., patrons of an establishment), and/or the like. In some implementations, the LAN 104a-104n can authenticate this message from the RCM server 102 (e.g., using the authentication code in the message) and display as appropriate. The RCM server 102 can at least substantially simultaneously establish links with the external resources or systems 114a-114n such as but not limited to ad exchanges, content management systems, etc. passing to the systems 114a-114n relevant information regarding the content being displayed by the devices 106a-106n, 108a-108n, 110a-110n in the LAN 104a-104n. For example, the RCM server 102 may share with an advertising server information about a particular establishment showing a game and the score of the game, allowing the advertising server to make a determination on whether to display an ad or sponsor a contest that can be relevant to the game and as such impactful (e.g., the information may relate to a bar in Toledo that is showing Redskins/Cowboys game and the score is tied in the $4^{th}$ quarter, and the advertiser may choose to sponsor a contest about the ultimate score of the game with a winner receiving the advertiser's product). Accordingly, the methods and systems disclosed herein reduce or eliminate the need for each LAN 104a-104n to interact with multiple systems 114a-114n (e.g., by bypassing cross domain protocol) including ad exchanges, content management systems, etc.

In some implementations, the auxiliary content provided by the RCM server 102 to the digital content control devices 112a-112n can be interactive. For example, the content can allow patrons to respond, via devices on the LANs (e.g., smartphones, tablets, etc.), to dynamic content shown on television monitors (e.g., patrons submit answers to a quiz). Further, the dynamic content can be based on events occurring during sporting events (e.g., a live sports feed) in substantially real-time (e.g., contest on who will hit the next home run, which team will win the game, etc.). In some embodiments, as noted above, the contests offered can be based on events occurring during the sporting events in substantially and/or near real-time (e.g., with or without any wagering (patron need not lose any money by participating in contest)). In addition, the RCM server 102 allows connection with smartphones (or other devices) of patrons of the restaurant. Patrons can enter wagers/games based on the events occurring in the sporting events. For users not connecting via the LAN (a user directly reaching a web site of the RCM server 102 via a media device, such as a personal computer (PC), smartphone, tablet, etc.), authentication codes can be left blank and, therefore, any messages can be ignored by the local browser on the media device.

In some implementations, the auxiliary content transmitted by the RCM server 102 and displayed on multi-media devices 106a-106n, 108a-108n, 110a-110n, can be displayed along with the content being displayed live at that moment. In some implementations, the auxiliary content can replace the content that is live on the multi-media devices. In some implementations, the display of the auxiliary content along with the live content or the replacement of the live content with the auxiliary content can be at least almost seamless or instantaneous. For example, the time interval between the live content being pulled-off and/or removed from the multi-media devices and the auxiliary content being displayed on the same multi-media devices (i.e., the duration of the "blank screen") can be in the range from about 1 millisecond to about 15 seconds, from about 5 millisecond to about 10 seconds, from about 10 millisecond to about 5 seconds, from about 50 millisecond to about 1 seconds, about 100 milliseconds, including values and subranges therebetween. In the instances where the auxiliary content is added on to the live content, little or no interruption to the live content may occur as a result of the addition of the auxiliary content. For example, the interruption may last no longer than about 5 seconds, about 1 second, about 100 millisecond, about 10 millisecond, about 1 millisecond, including values and subranges therebetween.

For example, in some implementations, the digital content control devices 112a-112n can be configured so as not to cause or create any blackout to the distribution of the TV/video feed on television sets 106a-106n, computers/tablets 108a-108n, personal devices such as smartphones 110a-110n, etc. For example, blackouts may not take place when there are changes of content, resizing, hiding or displaying content. That is, when an advertisement is added, in some implementations, the content may be live content and there may be no need for changes to have been previously scheduled and loaded (as such, live events can be effectively augmented). Further, as discussed above, the LANs 104a-104n (or the processors of the digital content control devices 112a-112n of the LANs 104a-104n) need not interact with the content providers and as such would not access the content feed provider and alter content real-time.

In some implementations, absence or near absence of blackouts may occur by having video zones be set to the same or substantially same frame rate and resolution as the display's (e.g., TV's) output. As such, interruptions of the video feed, if present, may not be perceptible to the naked eye when video zones are changed in size/aspect ratio. In some embodiments, blackouts may not occur or may be imperceptible even without the television sets 106a-106n, computers/tablets 108a-108n, personal devices, etc., being on the same ISP as the LANs 104a-104n. In effect, the digital content control devices 112a-112n can serve as "pass-throughs" of the video feeds (or other content) from various sources received from the RCM server 102 and at a digital content control device 112a-112n in a protocol (or using a command) executable by the digital content control device 102. This is in contrast to TV blackouts that occur for non ipaddress:8008 user data protocol (UDP) accessed buttons via that specific LAN's IP address, including the video feed (e.g., the live TV broadcast).

In some implementations, the methods and systems disclosed herein facilitate the absence or near absence of blackouts or interruptions of regular content when auxiliary content is added onto regular content. For example, when a chyron is added onto a live programming or content (e.g., as a banner at the bottom of a screen), in some embodiments, the loading of the auxiliary contents (i.e., chyron) may take some time based on the network bandwidth (e.g., ISP bandwidth, auxiliary content size, etc.), but the regular content or live programming may not be interrupted or there may not be any blackout (at least not a blackout that is perceptible to the naked eye). In some embodiments, this latency may also be smaller than, for example, the latency for live streaming on personal computers of live events for real-time ads and gaming. In such implementations, the regular programming or content may be re-sized (e.g., with same or similar aspect ratio), moved around on the screen, etc., but with little or no interruption or blackout of the content. As such, the methods and systems disclosed herein allow the remote and seamless management of live content inside display devices such as television sets 106a-106n, computers/tablets 108a-108n, personal devices such as smartphones 110a-110n, etc. Display of auxiliary content with little or no interruption of regular content (also referred to herein as the main content) is because of the secure two-way communication channel established between the digital content control device and the RCM server. By using the secure two-way communication channel, a user device coupled to the digital content control device does not require to disable or modify security configuration to access auxiliary content of a content provider via the RCM server, and thus does not need to interrupt presentation of the regular content.

In some embodiments, the RCM server 102 is configured to interact with multiple LANs 104a-104n (e.g., multiple restaurants and/or bars) at or nearly at the same time, and the content transmitted to the LANs 104a-104n may be the same or different between the LANs 104a-104n, allowing the RCM server 102 to send unique and/or distinct content to each LAN based on factors such as location of the LAN, type of establishment associated with the LAN, and/or the like.

In addition, in some implementations, the RCM server 102 can facilitate connection with smartphones of patrons of a restaurant or other venue having a LAN 104*a*-104*n* (with or without a digital content control device 112*a*-112*n*). Patrons can enter wagers/games based on the events occurring in a live sports events. In some implementations, the methods and systems disclosed herein may allow LANs 104*a*-104*n* to bypass the restrictions on cross-browser communication that exists between LANs 104*a*-104*n* to communicate with personal communication devices. In some implementations, personal devices such as smartphones can be provided with authentication codes to transmit to the RCM server 102 (instead of or in addition to the digital content control device 112*a*-112*n* transmitting an authentication code to the RCM server 102). The RCM server 102 can then establish a secure two-way communication channel with the smartphone. In addition, the RCM server 102 can store information on a database indicating with which LAN the smartphone is associated (through the authentication code provided by the LAN). In some implementations, the smartphone can then communicate with the RCM server 102 through a website (provided by the LAN or controller of the LAN) or an app (provided by third-parties such as advertising agencies). The RCM server 102 can then process messages from the LAN 104*a*-104*n* and send commands, as needed, to third party services. The RCM server 102 has the ability to send messages to both the personal communication device and the LAN 104*a*-104*n* (or the digital content control device 112*a*-112*n* on the LAN 104*a*-104*n*) for display on a display monitor (on a media device 110*a*-110*n*, 108*a*-108*n*, 106*a*-106*n*). As such, the methods and systems disclosed herein allow for a LAN to establish the secure two-way communication channel with smartphones (or other devices) without the using any special hardware and still comply with cross-browser and/or cross-domain communication protocols and/or restrictions.

Figure 2:
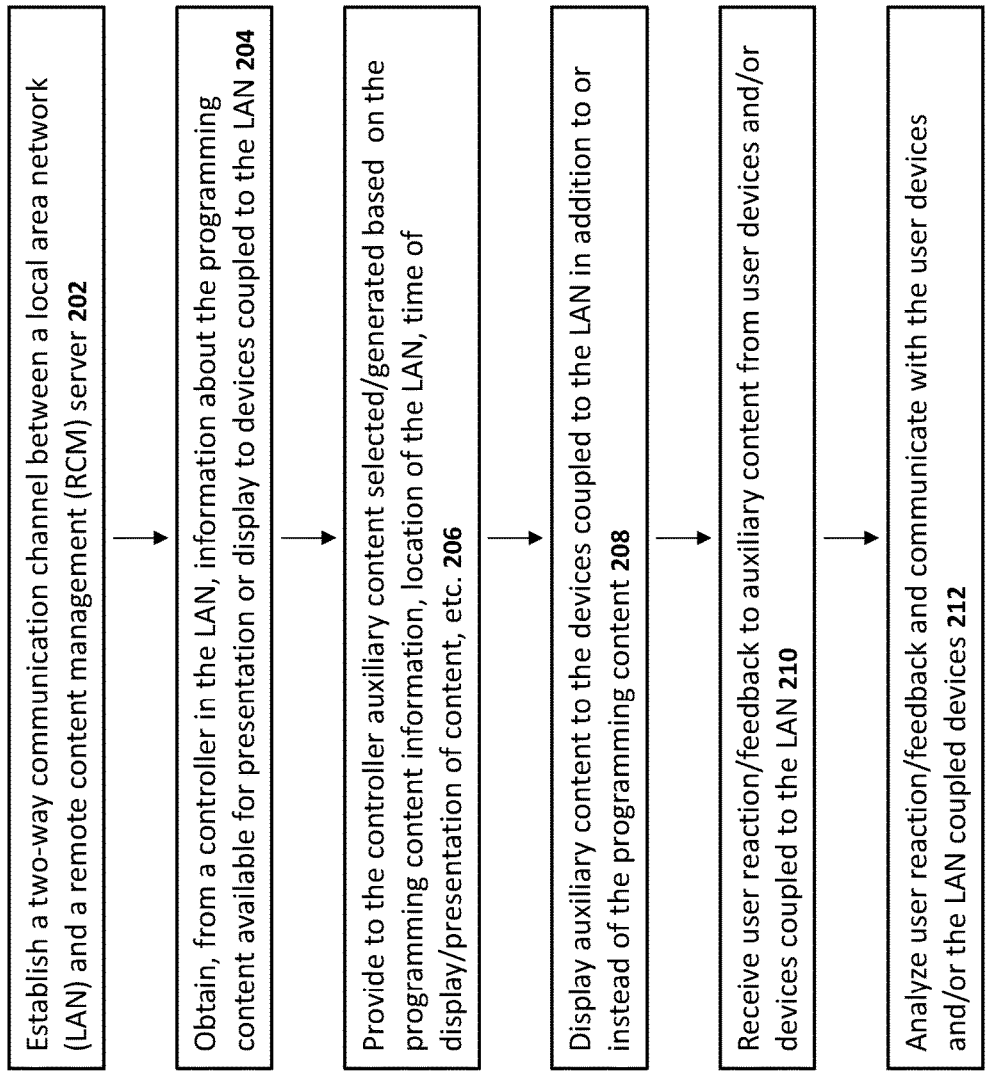
FIG. 2 is a flow chart illustrating a method of remotely managing content delivered to a local network area (LAN) including a set of devices coupled to the LAN, according to an embodiment.

FIG. 2 is a flow chart illustrating a method of remotely managing content delivered to a local network area (LAN) including a set of devices coupled to the LAN, according to an embodiment. In some instances, an RCM sever (e.g., RCM server 102 of FIG. 1) can implement the method of FIG. 2. At step 202, the RCM sever can establish a secure two-way communication channel with a local area network (LAN). At step 204, in some embodiments, the RCM server 102 obtains from a digital content control device in the LAN, information about the programming content (also referred to herein as the 'indication of available programming content') available for presentation or display to devices coupled to the LAN. The programming content can be programming content originated from an external LAN or an external content provider device such as, for example, a satellite television content provider, a cable television content provider, a streaming television content provider and/or any other suitable content provider that provides content directly to the LAN (or digital content control device in the LAN) and not via an RCM server 102. At step 206, in some embodiments, auxiliary content is generated or selected from a database based on the programming content information, location of the LAN, time of display/presentation of content, etc. At step 208, the auxiliary content is provided to a digital content control device for displaying along with or instead of the programming content on devices coupled to the LAN. At step 208, the RCM server can receive user reaction/feedback to auxiliary content from user devices and/or devices coupled to the LAN, and at step 210, RCM server can analyze user reaction/feedback and communicate with the user devices and/or the LAN coupled devices based on the results of the analyses. In some implementations, such user reaction/feedback is not analyzed at the RCM server and is instead passed to a third-party service provider (e.g., in a format associated with the third-party service provider) for processing and/or analysis.

FIG. 3 is flowchart illustrating a method 300 of establishing a secure two-way communication channel between a server and a digital content control device. As shown in FIG. 3, the method 300 includes establishing, at step 301, a connection between a first LAN coupled to at least one media device and a digital content control device, and a second LAN coupled to a set of content providers. The method 300 includes validating, at step 302, a first authentication code received from the digital content control device, and send a second authentication code to the digital content control device via the network connection. The method 300 includes establishing, at step 303, a secure two-way communication channel between the RCM server and the digital content control device to receive and send messages. The method 300 includes receiving, at step 304, a set of indications of available programming content from the set of content providers of the second LAN to be presented to the at least one media device of the first LAN. The method 300 includes providing, at step 305, a set of main content and a set of auxiliary content to be presented on the at least one media device such that the digital content control device does not cause a perceptible blackout when updating the at least one media device to present the set of main content and the set of auxiliary content.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
establishing a connection between a digital content control device and a remote content management (RCM) server via a network connection, the digital content control device being part of a first local area network (LAN), the first LAN being operatively coupled to at least one media device;

transmitting a first authentication code from the digital content control device to the RCM server via the network connection such that the RCM server during operation and after receiving the first authentication code:
   a) validates the first authentication code, and
   b) transmits a second authentication code to the digital content control device via the network connection;
establishing, using the first authentication code and the second authentication code, a secure two-way communication channel between the digital content control device and the RCM server to receive and send messages;
receiving, via the RCM server, an indication of available programming content from a content provider to be presented on the at least one media device of the first LAN, the content provider being part of a second LAN that is connected to the RCM server; and
receiving a set of auxiliary content at the digital content control device from the RCM server via the network connection and to be presented with the available programming content on the at least one media device, based on at least one of the indication of available programming content, a location of the first LAN, a location of the second LAN, a set of user feedback, or a time of display of content.

2. The method of claim 1, further comprising:
receiving a first set of messages from the RCM server, each message from the first set of messages being configured with the second authentication code; and
sending a second set of messages to the RCM server, each message from the second set of messages being configured with the first authentication code.

3. The method of claim 1, wherein the first authentication code is the same as the second authentication code.

4. The method claim 1, wherein the first authentication code is different from the second authentication code.

5. The method of claim 1, wherein the first authentication code is transmitted from the digital content control device to the RCM server in an encrypted format and the second authentication code is received from the RCM server at the digital content control device in an encrypted format.

6. The method of claim 1, wherein the first authentication code and the second authentication code are at least one of (1) Hypertext Markup Language (HTML), (2) Extensible Markup Language or (3) Javascript Object Notation.

7. The method of claim 1, wherein the at least one media device does not provide an Internet Protocol (IP) address to the RCM server.

8. The method of claim 1, wherein the RCM server selects at least one of a push or a pull to communicate with the at least one media device.

9. The method of claim 1, wherein the messages include at least one of a Hypertext Markup Language (HTML) file, an Extensible Markup Language (XML) file or a JavaScript Object Notation (JSON) file.

10. The method of claim 1, wherein security features of the at least one media device and the digital content control device are not modified or disabled when establishing the secure two-way communication channel.

11. The method of claim 1, wherein the RCM server is on a first network domain, and the at least one media device is on a second network domain, and the secure two-way communication channel provides cross domain access between the first network domain and the second network domain.

12. The method claim 1, wherein the RCM server does not send messages to the LAN without the second authentication code so that the secure two-way communication channel is preserved.

13. The method of claim 1, wherein the RCM server has access to at least one of a live sport feed, a database of programming content, a payment system, a rewards program, or an online advertising exchange platform.

14. The method of claim 1, wherein the RCM server has access to a dynamic advertising server, and a price of an advertisement to be displayed on the at least one media device can be based on context of programming displayed on the at least one media device.

15. The method of claim 1, wherein the at least one media device is a smartphone of a patron of an establishment, the RCM service can control wagers or games based on context of programming displayed on the at least one media device.

16. An apparatus comprising:
a memory of a remote content management (RCM) server; and
a processor of the RCM server, the processor operatively coupled to the memory,
the processor configured to establish a connection between a first local area network (LAN) and a second LAN, the first LAN being operatively coupled to at least one media device and a digital content control device, and the second LAN being operatively coupled to a set of content providers,
the processor configured to validate a first authentication code received from the digital content control device, and send a second authentication code to the digital content control device via the network connection,
the processor configured to establish a secure two-way communication channel between the RCM server and the digital content control device to receive and send messages that include at least one of the first authentication code or the second authentication code,
the processor configured to receive a set of indications of available programming content from the set of content providers of the second LAN and to be presented to the at least one media device of the first LAN, and
the processor configured to provide a set of main content associated with the set of indications of available programming content and a set of auxiliary content associated with the set of indications of available programming content, to the digital content control device and to be presented on the at least one media device such that the digital content control device does not cause a perceptible blackout when updating the at least one media device to present the set of main content and the set of auxiliary content.

17. The apparatus of claim 16, wherein the processor is configured to:
receive a first set of messages from the digital content control device, each message from the first set of messages including the first authentication code; and
send a second set of messages to the digital content control device, each message from the second set of messages including the second authentication code.

18. The apparatus of claim 16, wherein the processor is configured to not use socket programming or bypass browser security protocols to establish the secure two-way communication channel.

19. The apparatus of claim 16, wherein the messages include at least one of a Hypertext Markup Language (HTML) file, an Extensible Markup Language (XML) file or a JavaScript Object Notation (JSON) file.

20. A non-transitory processor-readable medium of a remote content management (RCM) server, storing code representing instructions to be executed by a processor, the code comprising code to cause the processor to:
- establish a connection between the RCM server and a digital content control device via a network connection, the digital content control device being part of a first local area network (LAN), the first LAN being operatively coupled to at least one media device;
- transmit a first authentication code from the RCM server to the digital content control device such that the digital content control device validates the first authentication code, and transmits a second authentication code to the digital content control device via the network connection;
- establish, using the first authentication code and the second authentication code, a secure two-way communication channel between the RCM server and the digital content control device to receive and send at least one of a Hypertext Markup Language (HTML) file, an Extensible Markup Language (XML) file or a JavaScript Object Notation (JSON) file;
- receive a set of indications of available programming content from a set of content providers and to be presented to the at least one media device of the first LAN, the set of content providers being part of a second LAN that is connected to the RCM server; and
- provide a set of main content associated with the set of indications of available programming content and a set of auxiliary content associated with the set of indications of available programming content, to the digital content control device and to be presented on the at least one media device such that the digital content control device does not cause a perceptible blackout when updating the at least one media device to present the set of main content and the set of auxiliary content.

21. The non-transitory processor-readable medium of claim 20, wherein the RCM server does not use socket programming or bypass browser security protocols to establish the secure two-way communication channel.

22. The non-transitory processor-readable medium of claim 20, wherein the available programming content can include at least one of a live sport feed, a live gaming feed, a database of programming content, a payment system, a rewards program, or an online advertising exchange platform.

23. The non-transitory processor-readable medium of claim 20, wherein the at least one media device includes at least one of a television, a personal computer, a video wall, a projector, a jumbotron, or a smartphone.

* * * * *